United States Patent [19]
Barker

[11] 3,951,285

[45] Apr. 20, 1976

[54] BOTTLE UNCASER

[75] Inventor: Theodore L. Barker, Sagamore Hills, Ohio

[73] Assignee: MBI Corporation, Northfield, Ohio

[22] Filed: Aug. 26, 1974

[21] Appl. No.: 500,350

[52] U.S. Cl. .............................. 214/309; 198/179; 214/1 BA; 214/152; 294/110 R
[51] Int. Cl.² ........................................... B65G 65/36
[58] Field of Search .......... 214/1 BA, 309; 198/179, 198/19, 20 R; 294/110, 90, 87.22, 87.24

[56] References Cited
UNITED STATES PATENTS

| | | | |
|---|---|---|---|
| 2,213,774 | 9/1940 | Taylor | 214/1 BA X |
| 2,629,627 | 2/1953 | Stone | 294/110 R |
| 2,679,328 | 5/1954 | Ballato et al. | 214/309 |
| 2,759,593 | 8/1956 | Copping | 198/179 |
| 2,783,869 | 3/1957 | Thurman | 214/309 X |
| 2,815,242 | 12/1957 | Kenyon | 294/110 R |
| 3,125,369 | 3/1964 | Copping | 198/179 X |
| 3,125,370 | 3/1964 | McGill | 198/179 X |
| 3,144,148 | 8/1964 | Merkner et al. | 214/309 X |

*Primary Examiner*—Frank E. Werner
*Attorney, Agent, or Firm*—Watts, Hoffman, Fisher & Heinke Co.

[57] ABSTRACT

Apparatus for automatically lifting containers, especially bottles, from moving cases. A series of closely adjacent, self-operating, grippers are carried along an endless path above a moving case or cases to be emptied. The grippers are laterally aligned with the columns of containers in a case and randomly grip the containers in an aligned row as they are guided into engagement. The grippers yield upwardly if obstructed as they are guided toward engagement with containers thereby permitting full depth cases to be emptied without coordinating a longitudinal relationship between any particular group of grippers and the case.

22 Claims, 7 Drawing Figures

BOTTLE UNCASER

BACKGROUND OF THE INVENTION

This invention relates to methods and apparatus for removing containers, such as bottles, from cases.

When containers, such as bottles or the like, are supplied from a manufacturer to a bottler, or when containers are returned to a bottler for washing and refilling, they are typically in cases and must be removed for processing. This is most efficiently accomplished with a machine that automatically lifts the containers from the cases and places them on a conveyor for further processing.

Several approaches have been proposed for unloading cases automatically. Basically, most involve moving a case along a conveyor and moving bottle-gripping mechanisms in the direction of case movement, and engaging the necks, crown rings, or reinforcing rings of the bottles with the gripping mechanism. The mechanism and case will typically move along paths that are adjacent in part and that diverge at some point after the bottles are gripped to remove the bottles from the case. The bottles are then subsequently released, typically onto a conveyor. In some instances, separate gripping fingers are used to engage each bottle. These have required mechanisms to operate the grippers at the proper location relative to the case at the pick up and relative to a discharge conveyor at the release point, in order to properly grasp and release the bottles. If the case walls are the full height of the bottles, special coordination has been necessary between a particular group of gripping fingers and the case, so that the fingers can be moved into the case to grasp the bottles without interference from the case end walls. In other instances, continuous moving belts on opposite sides of rows of bottles are guided into converging and diverging relationship, to engage, carry and release the bottles at appropriate locations along the conveying path. These are used with cases in which the bottles extend above the case walls.

In those known constructions that have required only alignment of the gripping mechanism with the moving columns of bottles in the cases, the mechanism has not been suitable for use with a full-height case. This is because the case end walls, oriented transversely to the path of case movement, interfere with the gripping mechanism as the case is conveyed past the mechanism to the location where the bottles are to be engaged. That is, since the engaging mechanism must be below the tops of the bottles, a so-called full-depth or full-height case cannot typically pass by the mechanism. Conversely, where full-depth cases have been required to be unloaded, it has been necessary to provide coordinated entry of a group of grippers into a case when the case is at a particular location.

Case unloaders of any of the above described types have required careful positioning and control of the bottle grippers relative to the moving cases, and require a specific location along the conveying path for engaging the bottles and a specific location for releasing the bottles, because of the use of mechanisms that cooperate with the grippers to control their opening and closing.

SUMMARY OF THE INVENTION

The present invention overcomes the above and other limitations and disadvantages of known case unloaders, with a novel apparatus that unloads full or partial height cases with equal facility, in which gripping mechanism are self-actuated and therefore grip and release containers without the need for a prelocated operating member, and in which a plurality of grippers are carried in closely-adjacent relationship to assure the gripping of containers without any need to coordinate the location of the containers along the path of movement relative to the grippers or to a particular group of grippers at the time of engagement.

Briefly, the present apparatus utilizes a generally horizontal case conveyor and a driven unloading conveyor above the case conveyor. Parallel columns of closely adjacent grippers are carried by the unloading conveyor along an endless path in the same general direction as the case conveyor. Each column is aligned with a column of containers in a moving case to be unloaded. The grippers are of tong-like construction, adapted to grip the containers, such as bottles, on opposite sides of a rim or neck portion.

The path of movement of the grippers is controlled so that they approach the path of a horizontally moving case at an angle to the horizon, engage the containers, and depart from the path of case movement at an angle opposite to that of the approach. At the juncture of the approach and departure angles, the grippers extend to a level at which they are beneath the tops of the containers and of course are beneath the upper edge of a full-height case.

The grippers depend from the unloading conveyor and are constructed so that they can be moved vertically upward toward the conveyor from which they are suspended. Thus, where they would otherwise obstruct or be obstructed by a leading or trailing end wall of a case as the case moves to the lowest part of the path of gripper movement, the depending grippers are displaced upwardly as they contact the wall.

The grippers are thin in the direction of conveyor movement, preferably about equal in size to the container portion to be gripped. This, coupled with a close or directly adjacent relationship, one to the next in each column, assures that each container in the case columns will be engaged by a gripper. It also assures that displacement of a gripper by a case wall will not hinder engagement of the container adjacent the wall by an adjacent gripper that will overlie the container and extend downward into the case.

When carried in the angular path toward and away from the path of case travel, the grippers hang vertically because of a pivoted relationship to the carrying conveyor and each is in contact with a preceding and succeeding gripper, but at a slightly different level. This maintains a gripping edge or surface of each opposed tong arm of the gripper, which is adapted to engage a rim or the like of the container necks, in a horizontal orientation. During movement away from the path of case travel, the somewhat lower adjacent gripper serves as a stop behind a container carried by a preceding gripper to prevent the container from slipping rearwardly from the carrying gripper due to inertia or vibration.

By virtue of the tong-like construction of the grippers, they will open if the ends are pushed upward and will close when freely suspended. Thus, as the suspended grip fingers move in an approach angle toward a case, they open upon contact with a container top as their downward movement is obstructed. The grip fingers then receive the upper structure of the container, such as the crown rim or reinforcing ring of a bottle, and close as they are lifted away from the gripped container upon movement along the departure angle from the case conveyor path.

In the preferred embodiment the grippers are gravity biased to an extended, closed position when suspended along the lower reach of the unloading conveyor, directly above the case conveyor. The fingers are relatively light in weight and hence are easily displaced upwardly by a container or by the edge of the case end walls on a full height case. Sufficient upward displacement is accommodated by the gripper construction to prevent any development or undue force or interference between the gripper and the case when the case end wall obstructs downward movement. Easy self-releasing of a carried container is also assured by this construction when the gripper is guided along a path that lowers the containers onto a support surface. Once the containers are supported, continued lowering of the gripper toward the support spreads the tong arms to release the container. Thereafter, relative movement of the gripper with respect to the container, as by movement in an arc upwardly and forwardly from the container, completes the release. This movement is facilitated by limiting the degree of pivoting of the grippers relative to the conveyor support so each gripper spaces itself at its distal end from the following gripper.

Lateral alignment of gripper columns with columns of bottles in the cases to be unloaded is facilitated by slidably supporting the grippers on transverse rods carried between conveyor chains. This not only permits proper alignment of the grippers with the columns of containers in the cases, but also facilitates limited lateral self-adjustment of an individual gripper upon contact with a misaligned container.

For purposes of aligning the columns of grippers with the container columns, adjustable guides are provided that will channel misaligned grippers into a desired lateral position as they move through the guides. Adjustment of the guides is made to accommodate cases of different column alignment and to displace an entire row of grippers out of alignment with the path of case travel for cases with fewer columns of containers.

The above and other features and advantages of this invention will become more apparent from the detailed description which follows, when considered in connection with the accompanying drawings.

DETAILED DESCRIPTION

Figure 1:
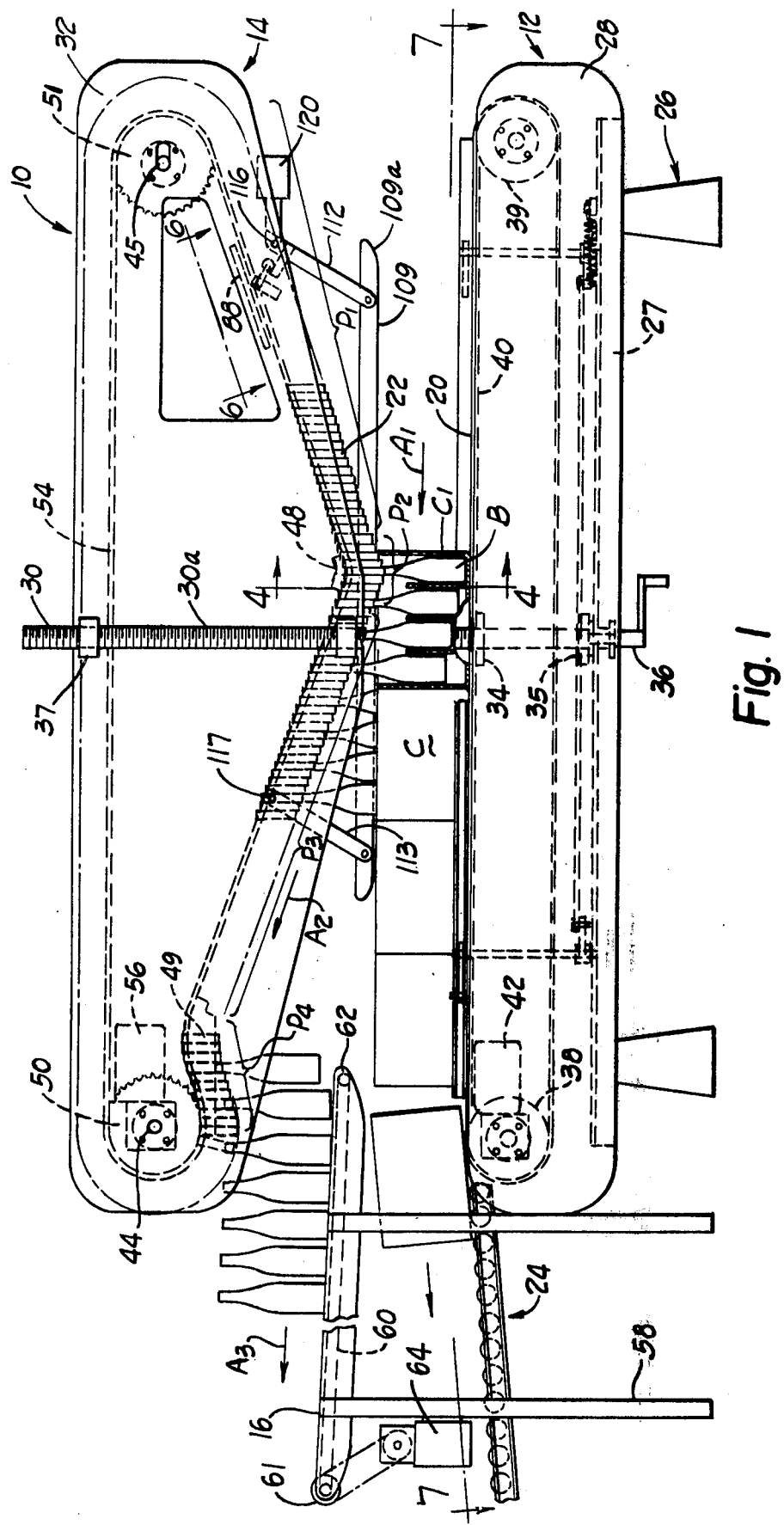
FIG. 1 is a side elevational view of a case unloader embodying the present invention, diagrammatically illustrating the manner in which bottles are removed from cases.

A case unloader 10 embodying the present invention is shown in FIG. 1, for engaging and lifting containers B from cases C. The unloader 10 includes a case conveyor 12 that moves cases along a horizontal path for unloading, a container-engaging and transporting conveyor 14 above the conveyor 12 for lifting containers from the moving cases, and a container-receiving conveyor 16 adjacent to and below the conveyor 14, for receiving containers released by the conveyor 14 and transporting them from the release area.

As diagrammatically illustrated, an endless belt 20 of the case conveyor 12, driven at a uniform speed with the upper reach moving in the direction of the arrow A1, carries cases C along a horizontal path beneath the container conveyor 14. Grippers 22 of the conveyor 14 are carried downward along an inclined path portion P1 toward the case C1 to grip containers B within the case at a path portion P2. The grippers and the gripped containers are then carried upwardly along an inclined path portion P3 away from the case, and then are subsequently moved downward to deposit the containers on the receiving conveyor 16. Empty cases C are discharged to a roller conveyor 24.

Figure 7:
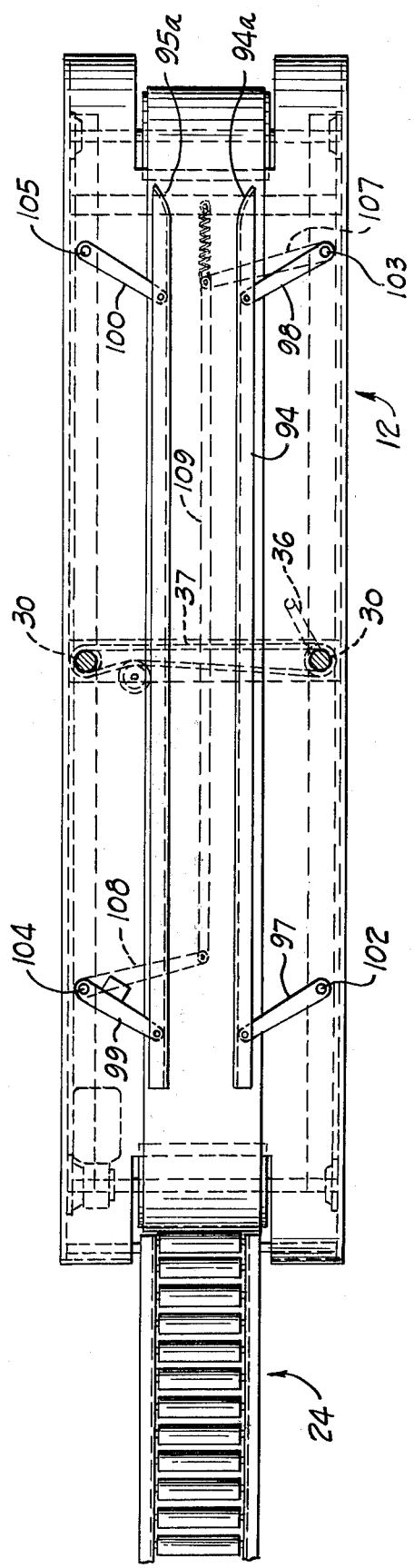
FIG. 7 is a view taken from the plane indicated by the line 7—7 of FIG. 1, showing the case conveyor and a mechanism for centering cases on the conveyor.

The case conveyor 12 and the container conveyor 14 are carried by support structure 26 that includes a base framework 27, two laterally spaced lower side plates 28, two vertical screws 30, one on each side of the conveyors at a longitudinally central location, and two laterally spaced upper side plates 32. The screws are each carried by and journaled in two vertically spaced lugs 34, 35 on each lower side plate 28, and a threaded portion 30a of each screw is received in vertically spaced internally threaded lugs 37, 38 carried by each upper side plate 32. A crank 36 secured to the lower end of one of the screws 30 and connected through a chain drive 37 (FIG. 7) to the lower end of the opposite screw 30, can be rotated to turn the screws and adjust the height of the conveyor 14 relative to the conveyor 12 to accommodate containers and cases of different heights.

The lower side plates 28 support the endless belt 20 on a drive roll 38, an idler roll 39, and a slide plate 40 underneath the upper reach of the belt 20. The drive roll 38 is driven by an electric motor 42 to move the belt to carry the cases C in the direction of the arrow A1.

Chain wheel shafts 44, 45 extend between and are carried by opposite ends of the upper side plates 32. Two chain wheels 50 are carried by the shaft 44 adjacent the inside surfaces of the upper side plates and two chain wheels 51 are carried by the shaft 45 aligned with the wheels 50. Each pair of chain wheels 50, 51 carries a chain 54. Chain guides 48, 49 are carried by the side plates 32 to guide the lower reach of each chain along the path shown in FIG. 1. The chains 54 are driven in the direction of the arrow A2 in FIG. 1 by a motor 56 that drives the shaft 44.

A separate frame 58 supports the conveyor 16 and the roller conveyor 24. The conveyor 16 has an endless belt 60 extending about a driven roller 61 at one end of the conveyor and about an idler roll 62 at the other end. A motor and drive belt assembly 64 drive the roller 61 to move the belt 60 in the direction of the arrow A3.

Each link of the two laterally-spaced chains 54 carries a cross rod 68 that extends between the chains. See FIG. 4. A plurality of grippers 22 is carried on each cross rod 68, five being carried in the embodiment shown in FIG. 4.

Figure 2:
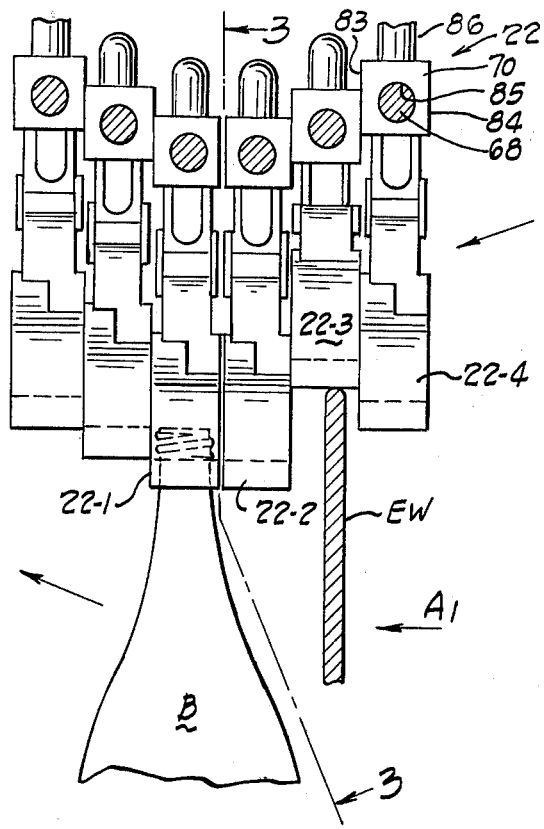
FIG. 2 is a fragmentary side elevational view of the apparatus of FIG. 1, illustrating in detail the manner in which grippers engage a container in a full-height case and accommodate an end wall of the case.
Figure 3:
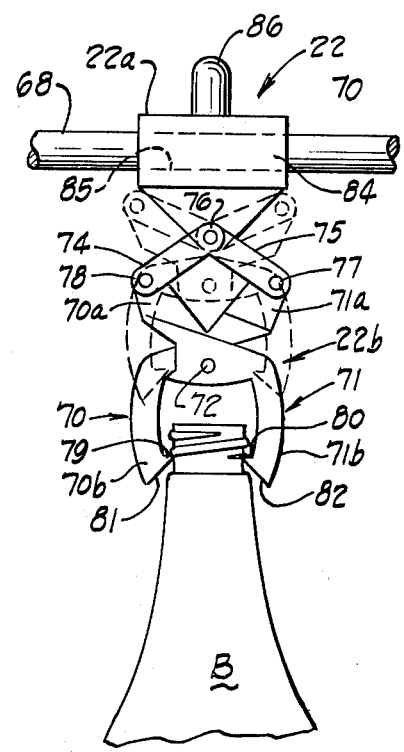
FIG. 3 is a fragmentary front elevational view of a portion of the conveyor of FIG. 2 taken along the plane indicated by the line 3—3, illustrating in detail the construction of a gripper.

As best shown in FIGS. 2 and 3, the grippers 22 each have a support part 22a carried for pivoting and sliding on the rod 68, and a container gripping part 22b that engages the containers to be removed from a case. The gripping part 22b is comprised of two tong arms 70, 71 secured together by a pivot pin 72 intermediate two ends 70a, 70b and 71a, 71b of each arm. The ends 70a, 71a are connected to a common pivot 76 on the support part 22a by pivoted link pairs 74, 75, respectively, on the front and back side of each arm, secured thereto by pivot pins 77, 78.

The ends 70b, 71b have inwardly directed flat horizontal support surfaces 79, 80, respectively, that face upward when the grippers are suspended as shown in FIG. 3. The surfaces are constructed to support a container by engaging a rim, crown ring or the like on diametrically opposite sides of the container. The extremities of the ends 70b, 71b have external surfaces 81, 82 that are inclined upwardly and inwardly and which serve to cam the arms open as they are lowered onto a container. The arms 70, 71 hold the surfaces 81, 82 spaced apart a distance sufficient to engage a container top on opposite sides when the arms are in a closed position so they will be cammed open as they are lowered.

As best shown in FIG. 2, the ends 70a, 71a are thinner than the ends 70b, 71b so the links 74, 75 are recessed with respect to the front and back surfaces of the grip fingers, permitting the ends 70b, 71b of the arms of each gripper to be in direct engagement with those of the next adjacent gripper. The thickness of the ends 70b, 71b, i.e., the dimension in the direction of conveyor travel, is approximately equal to the dimension, in the same direction, of the container to be gripped. This eliminates any possibility that the gripper overlying the container can be interfered with by any obstruction adjacent the containers. It also minimizes the possibility that the container (especially a container with a circular periphery) will be engaged and lifted by more than one gripper.

Figure 4:
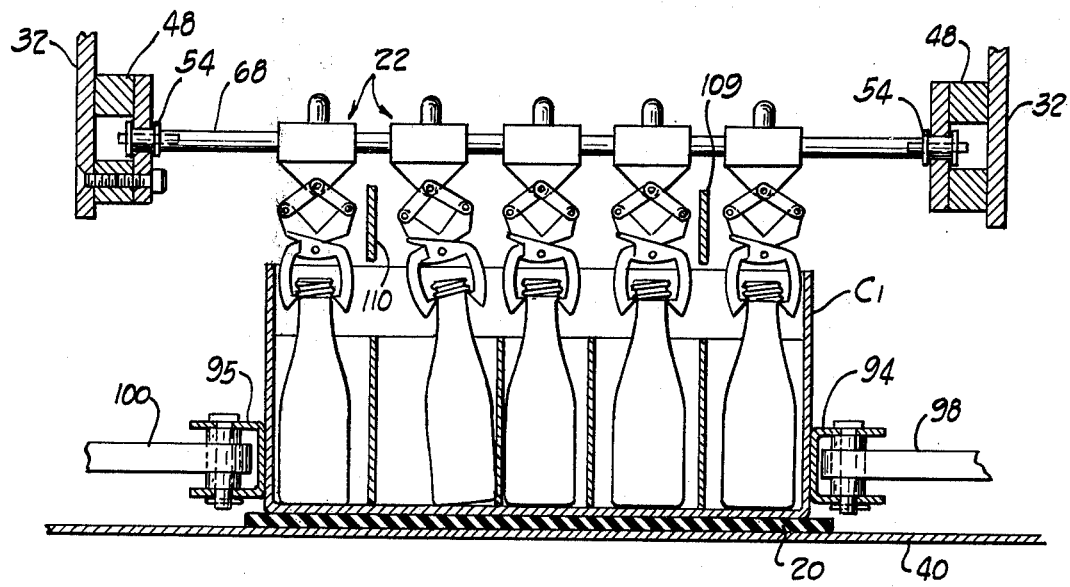
FIG. 4 is a partial transverse sectional view taken along the plane indicated by the line 4—4 of FIG. 1 and diagrammatically indicates the manner in which the grippers are transversely spaced in columns and in which a misaligned container can be gripped.

The support part 22a has parallel front and back walls 83, 84, as best shown in FIG. 2, that are part of a generally rectangular portion through which an aperture 85 is provided for receiving the cross rod 68 with clearance. The clearance facilitates sliding of the support part on the rod to adjust the lateral position of the columns of grippers relative to the columns of bottles to be removed from cases. The sliding also facilitates self-adjusting of the grippers if they engage a container misaligned in the column. This is best illustrated in FIG. 4, in which the gripper 22, second from the left, has engaged a misaligned container. As the rod 68 lifts the grippers and containers, the tendency will be for the support part 22a, second from the left in FIG. 4, to slide toward the right into alignment with the container and then properly apply pressure to the container through the grip part 22b to lift it.

Figure 5:
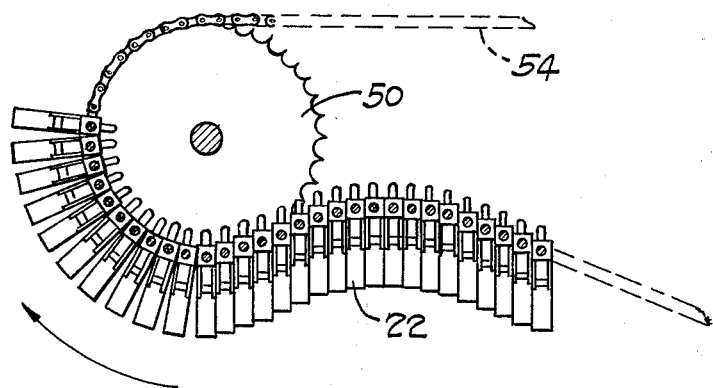
FIG. 5 is a partial side-elevational view of the apparatus of FIG. 1, with parts removed, illustrating the path of movement of the grippers at the location where the containers are released and illustrating the spacing achieved between grippers to facilitate release.

The pivoting facilitated through the clearance between the rod 68 and support part 22a permits the grippers to hang vertically when the chain 54 is moving along a path at an angle to the horizontal. The thickness of the support part 22a, between the front and back walls 83, 84, is slightly less than the pitch of the chain 54, by an amount coordinated with the angle of chain travel in the approach and departure to the case conveyor along path portions P1, P3, so that the grippers are in surface-to-surface contact, each with the next, along the path portions P1, P3. This assures that the grippers will be as close together as possible at the bottom position P2 where they engage the upper portions of the containers B, and therefore will be certain to engage the containers without predetermined coordination between the cases and the grippers in the longitudinal direction of travel. It also assures that the grippers will extend generally radially of the sprocket 50 as they travel around the path defined by the sprocket. See FIG. 5. This provides a separation between adjacent grippers at the location where they release the containers and accelerates the distal ends of the grippers away from the released containers.

The grip portion 22b moves through a substantial distance between an extended position of the tong arms 70, 71 as shown in FIG. 3 in solid line, and a fully lifted position, as shown in phantom. As illustrated in FIG. 2, this distance adequately accommodates the end wall of a full-height case, without obstructing movement of the grippers along the path, relative to the cases. The weight of the tong arms holds them in an extended position on the lower reach of the conveyor travel. When the tong arms are upside down, as on the upper reach, they are in the position shown in phantom in FIG. 3, but inverted.

As shown in FIG. 2, grippers 22-1 and 22-2 are at the lowest point of travel. Gripper 22-1 has engaged a container B. Gripper 22-3 is engaged with and resting on an end wall EW of the case C1 and is lifted partially upward from its extended position. Gripper 22-4 is outside the case C1. All grippers shown in FIG. 2, except 22-1 and 22-2 are in front-to-back contact, each with the next, because the chain carrying the grippers is oriented at an angle of approach or departure with the horizon. At the bottom of the travel, where the direction of chain travel is essentially horizontal along path portion P2, there is a slight space between the adjacent grippers, as between grippers 22-1 and 22-2. This distance, for example, may acceptably be approximately 1/16 inch. Once the grippers move from the lower position along the path of departure P3 from the case conveyor, the grippers support a container B, as best shown in FIG. 1, lifting it from the case.

In a preferred embodiment, a chain pitch of 1 inch is used and the width of the support part 22a, between the surfaces 83, 84 is 15/16 inch. The angle of departure and approach of the chain relative to a horizontal plane is 20½°. With that arrangement, the grippers hang vertically with the adjacent surfaces 83, 84 of adjacent grippers in face-to-face contact when the chain travels along the inclined approach P1 or the inclined departure path P3. Also, the support parts 22a interfere with pivoting as the grippers are moved about the sprockets 50, holding them radially of the sprocket.

As shown in FIG. 1, the chains 54 are directed from the angle of departure along path P3 into a slight angle of approach along a path portion P4 by the guide plates 49. The conveyor 16 underlies the sprockets 50 and those portions of the chains 54 that are redirected downward. Containers B carried by the grippers will then be lowered onto the conveyor 16 and will make contact with the conveyor prior to the grippers reaching the lowest part of the path portion P4. The further movement of the grippers toward the conveyor 16 after the containers are supported by the conveyor, will cause the tong arms 70, 71 to open. The grippers will then be swung in an arc about the circumference of the chain wheels 50, moving them away from the supported containers. At the same time, the supported containers will be moved away by the conveyor 16 for further processing.

Figure 6:
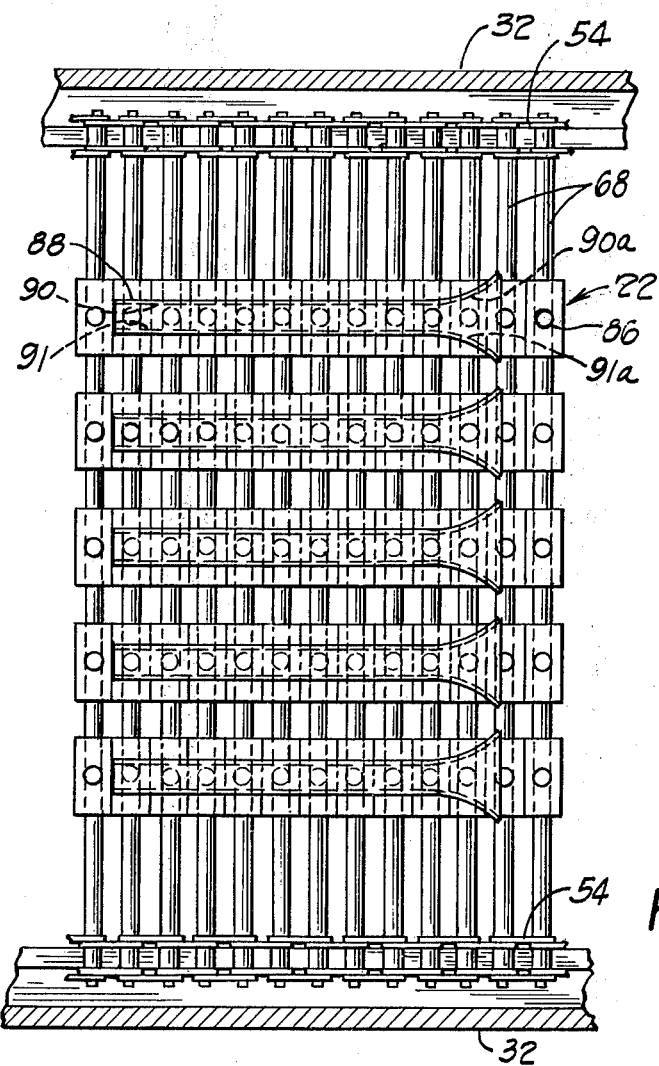
FIG. 6 is a view taken along the plane indicated by the line 6—6 of FIG. 1, illustrating mechanisms for aligning the grippers in columns corresponding with the columns of containers in a case.

Adjustment of the grippers along the cross rods 68, for alignment with columns of containers in cases, is facilitated by upstanding studs 86 that cooperate with adjustable guides 88 shown in FIG. 6. Each guide 88 is located above the cross rods 68, at the location shown in FIG. 1, and is carried by supports (not shown) between the side plates 32. The positions of the guides 88 between the side plates are adjustable to establish the desired transverse location of the grippers above the case conveyor 12. Each guide 88 has two depending blades 90, 91 extending in the direction of gripper travel. The blades are spaced the width of the studs 86 and have flared entry portions 90a, 91a that funnel the studs into alignment if they are transversely displaced. By moving the guides to different positions across the path of case travel, the grippers can be placed in desired alignment with the container columns. Further, one or more rows of grippers can be moved to one side or the other of the cross bars 68, out of the path of case travel. This permits a single machine to be used with cases having a different number of columns of containers.

Alignment of the cases C along the conveyor 12 is important to assure that the columns of containers in the cases are in the anticipated position, directly beneath the columns of grippers. To assure this, interconnected movable guide bars 94, 95 (FIG. 7) are provided that extend longitudinally adjacent the conveyor belt 20, just above the conveyor surface. These guide bars are carried on parallel arms 97, 98 and 99, 100. Each parallel arm is secured in fixed relationship to the top of a vertical pivot shaft 102–105, respectively, fixed to the lower end, beneath the conveyor. The arms 107, 108 are connected by a longitudinal link 109, that coordinates the pivoting of the shafts 103, 104. As a result, lateral movement of one guide bar 94 or 95 causes the other guide bar to adjust a similar distance in an opposite direction relative to a longitudinal centerline midway between the two. End surfaces 94a, 95a of the guide bars are inclined, the width of the inclined surface being greater than the variation between case widths. As a result, when a case reaches the conveyor 12 it will space the guide bars 94, 95 to the width of the case. At the same time, the guide bars will maintain a relationship equally spaced from a center line along the conveyor. This will center the cases along the conveyor in a predetermined alignment, relative to the conveyor 14.

Two stripper bars 109, 110 (see FIGS. 1 and 4) extend longitudinally above and parallel to the case conveyor 12. Each is carried on parallel links 112, 113 suspended from cross shafts 116, 117. The arms 112 are counter-weighted as at 120, but remain slightly biased to a lower position. These bars, as shown in FIG. 4, are laterally between columns of containers and serve to retain the case separators within the cases as the containers are lifted. They also serve to ride along the upper edge of a full-height case, typically being lifted somewhat as the case moves beneath them. For this purpose, the leading ends 109a are inclined, serving to cam the bar to the necessary height required by the case. A switch actuator 121 is carried by the link 112 and operates a microswitch 122 when the bar 109 is lifted to a predetermined position. Because the bars are supported by the side plates 32, the predetermined position at which the switch 122 is operated serves to signal when the height of a case may be too high for the space between the conveyor 14 and the conveyor 12. Thus, when the guide bar 109 is lifted to the point of actuating the limit switch 122, the machine operation is stopped.

In operation, the conveyors 12, 14, 16 are placed into operation, moving in the direction of the arrows A1, A2 and A3. Cases C are moved onto the conveyor belt 20 adjacent the right-hand end as viewed in FIG. 1. The cases are centered on the belt by the guide bars 94, 95 and, if the cases are full-height cases, they will lift the stripper bars 109, 110. The height of the conveyor 14 is adjusted if necessary so that the grippers at the path portion P2 will be at a level to engage the upper portions of the containers B, as illustrated in FIG. 2.

The speed of the chains 54 is established to be slightly greater than the speed of the belt 20, by an amount such that the horizontal velocity component of the chains is equal to the velocity of the horizontal belt 20. This assures that there will be no relative movement between the grippers, containers, and cases in the horizontal direction, as the containers are engaged and removed from the cases.

Adjacent the lowest position of the chain 54, i.e., at the path portion P2, the grippers are continuously lowered into the case as it moves through that location. Any gripper that overlies a container will first contact the container, raising the lower grip part 22b so as to open the tong arms, and will then slide over the upper portion of the container, with the tong arms being on two opposite sides of the container. In the case of a conventional bottle, the surfaces 79, 80 of the tong arms will engage either the crown ring or reinforcing ring of the bottle top, or in the case of a threaded bottle, may grip a thread or a protrusion beneath the thread. A gripper that overlies a transverse end wall EW of the case will tend to be lifted by the end wall, raising it to an upper position but in no way interferes with the movement of the grippers or the case.

As the grippers are carried upward by movement of the chain along the departure path P3 from the lowest position P2, the tong arms 70, 71 that are on opposite sides of a container top will tighten against and grip the container because the weight of the tong will tend to move it to an extended condition, which closes the arms. The grip will be tightened further by the additional weight of the container, as the extended tong is raised during further travel along path P3, lifting the container from the case. All containers clear the case by the time the grippers reach the path portion P4 and before the cases reach the end of the case conveyor.

Continued movement of the chains 54 carry the grippers and the containers along the path P4 defined by the chain guides 49. This moves the containers again toward the conveyor 12 and the containers are received on the conveyor 16, while the grippers continue their downward movement. This automatically opens the tong arms 70, 71, releasing the container. As the grippers then move around the chain sprockets 50, the distal ends become spaced because pivoting is obstructed by the close proximity of the adjacent support parts 22a, further enhancing the release of the containers. The containers are then carried by the conveyor 16 for further processing.

Although the invention has been described in its preferred form with particularity, it will be understood that modifications and alterations can be made therein without departing from the spirit and scope of the invention, as set forth in the appended claims.

What is claimed is:

1. In apparatus for removing containers from full depth as well as other cases, including means to move a case along a predetermined path, said case having columns of containers aligned in the direction of case movement, and an endless conveyor loop above said path carrying means vertically suspended below the loop along a lower reach, means to successively engage containers of each column and lift the containers from the case while the case is moved along the path, the improvement wherein the means to engage containers in each column comprises container grippers of tong construction that are essentially contiguous one to the next along a lower reach of the endless conveyor, will self-open when lowered onto a container, move upward when lowered onto an obstruction, and close under gravity forces when raised, and means to guide said grippers along a path that brings them toward the path of case movement to lower them into engagement with containers and then directs them away from the path of case movement.

2. The apparatus of claim 1 including a support beneath a portion of said endless conveyor for receiving containers removed from cases, wherein the improvement further includes means to guide said grippers to a position where the containers are supported by said support and the grippers are lowered relative to the containers to release the containers.

3. The apparatus of claim 1 wherein the grippers are individually movable vertically upward from a freely suspended condition independent of one another a distance greater than the depth to which they receive the containers when in gripping engagement therewith, whereby a gripper overlying a case wall when brought toward the path of case movement will move upward relative to the conveyor to accommodate the wall.

4. The apparatus of claim 1 wherein said path along which said grippers are guided includes two straight portions inclined toward said path of case movement from opposite directions and a relatively short apex portion between the two.

5. The apparatus of claim 4 wherein said two straight portions are inclined at equal angles toward said path of case movement.

6. Apparatus for removing containers from cases, comprising a driven conveying loop movable along a path, a plurality of means carried by said loop each for supporting a plurality of container grippers in rows transverse to said path, a plurality of container grippers each supported by said means for pivotal movement about an axis transverse to said path and for movement laterally of said path, said means being closely spaced along said loop and said grippers carried by each means being spaced laterally of said path so that said grippers are arranged in laterally spaced columns having little or no gaps along their length, means for guiding said conveying loop along a path that approaches a horizontal plane at an angle and along a successive path portion that extends away from said horizontal plane at an angle and that reverses the direction of said loop at opposite ends of said path through two arcs of about 180°, and means limiting pivoting of said grippers relative to said gripper supporting means to an amount equal to the larger of said angles, whereby said grippers can hang vertically in close relationship in said columns and will extend generally radially when moved through said arcs to space the distal ends of the grippers one from the next.

7. Apparatus as set forth in claim 6 wherein said angles are equal.

8. Apparatus as set forth in claim 6 wherein said means to limit pivoting comprises flat facing surfaces on the front and back of each gripper adjacent said supporting means, said surfaces having sufficient height relative to the spacing between grippers that portions of the faces abut when the grippers are pivoted to thereby limit pivoting.

9. In a method of removing containers from cases, the steps of: moving a case of containers along a path; moving container grippers, that are gravity actuated to grip containers and that are collapsible upward when lowered onto an obstruction, above said path first in a direction along and toward said path to a position beneath the level of the tops of containers to be removed and then in a direction along and away from said path, said grippers being moved in a continuous column in mutual contact one with the next above each column of containers in the case as they move toward and away from said path; changing the direction within a distance along said path less than the length of the cases to be unloaded; engaging containers along first and second inclined path portions, both of which have a directional component in the direction of case movement and the first of which has a directional component toward said path and the second of which has a directional component away from said path, with said grippers when they are at a position beneath the level of the tops of containers and lifting the containers from the case as the grippers engaged with containers are moved along and away from said path; and coordinating the speed of movement of the grippers and the case so the grippers move along and toward said path and along and away from said path with a speed component in the path direction equal to that of the case.

10. The method as set forth in claim 9 including the subsequent steps of moving the container grippers above a container receiving conveyor and then lowering them toward said conveyor a distance slightly in excess of that necessary to deposit the carried containers on the conveyor whereby the grippers release their hold on the containers.

11. The method as set forth in claim 10 including the subsequent step of swinging the grippers in an upward arc immediately after they have released their hold.

12. Apparatus for removing containers from cases, comprising a driven conveying loop movable along a path, a plurality of rods carried in closely spaced relationship by said loop each supporting a plurality of container grippers in rows transverse to said path, a plurality of container grippers each supported by said means for pivotal movement about an axis transverse to said path and for movement laterally of said path, said rods extending through apertures of said grippers with a clearance fit so the grippers are pivotable and slidable longitudinally thereof, said grippers carried by each rod being spaced laterally of said path so that said grippers are arranged in laterally spaced columns with little or no gaps along their length, and means supported adjacent said driven conveying loop and said rods for aligning grippers in columns at predetermined locations laterally of said path.

13. Apparatus as set forth in claim 12 including means to adjust the position of said means laterally of said path.

14. Apparatus as set forth in claim 12 wherein said grippers are suspended when carried along a lower reach of said loop and are yieldably movable vertically relative to the loop.

15. Apparatus as set forth in claim 14 wherein said grippers are tongs that are self opening when pushed upward from below relative to their support and are self closing when freely suspended.

16. Apparatus for removing containers from cases, comprising a conveyor for moving cases along a path, a driven conveyor loop movable along a path above said conveyor, means carried by said loop for supporting a plurality of container grippers in rows transverse to said path, a plurality of container grippers each supported by said means for pivotal movement about an axis transverse to said path and for movement laterally of said path, said grippers along a lower reach of the conveyor loop depending vertically and being each directly adjacent a next in the direction of conveyor movement, and means directing the lower reach at an angle toward and away from the case conveyor, said grippers along the lower reach being movable upward relative to the supporting means by a transverse wall of a case moving along said conveyor, whereby a full depth case can be accommodated at any location along said conveyor relative to the grippers.

17. Apparatus as set forth in claim 16 wherein said grippers are slidable laterally of said path on said support means, and including means adjustable laterally of said path for engaging said grippers as they are moved by said conveying loop and sliding them laterally of said path on the support means.

18. In apparatus for removing containers from cases, including means to move a case along a predetermined path, said case having columns of containers aligned in the direction of case movement, and an endless conveyor above said path carrying vertically suspended means to successively engage containers of each column and lift the containers from the case while the case is moved along the path; the improvement wherein the means to engage containers in each column comprises closely adjacent container grippers of tong construction that are constructed and arranged to collapse upward when lowered onto a carton edge, to self-open when lowered into engagement with a container, and to extend and self-close under gravity forces when thereafter lifted so as to grip and lift an engaged container; wherein means is provided to guide said grippers along a path toward the path of case movement to engage them with containers and then direct them away from the path of case movement.

19. In apparatus for removing containers from cases, including means to move a case along a predetermined path, said case having columns of containers aligned in the direction of case movement, and an endless conveyor above said path carrying vertically suspended means to successively engage containers of each column and lift the containers from the case while the case is moved along the path; the improvement wherein the means to engage containers in each column comprises directly adjacent container grippers of tong construction that are in contact one to the next along a lower reach of the endless conveyor and that are constructed and arranged to collapse upward when lowered onto a carton edge, to self-open when lowered into engagement with a container, and to extend and self-close under gravity forces when thereafter lifted so as to grip and lift an engaged container; wherein means is provided to guide said grippers along a path a portion of which brings them toward the path of case movement to engage them with containers and a subsequent portion of which then directs them away from the path of case movement, said path portions extending at substantially equal angles to the path of case movement; and wherein said means to move a case along a predetermined path is non-coordinated with movement of said endless conveyor in the sense that the relative positions of a case and grippers of the conveyor, along the paths of travel, are not controlled.

20. Apparatus as set forth in claim 19 wherein said grippers are slidable laterally of said path on said support means, and including means adjustable laterally of said path for engaging said grippers as they are moved by said conveying loop and sliding them laterally of said path on the support means.

21. In apparatus for removing containers from cases, means to move a case of containers along a path; container grippers that are gravity actuated to grip containers and that are collapsible upward when lowered onto an obstruction; means to move the container grippers above said path first in a direction along and toward said path to a position beneath the level of the tops of containers to be removed and then in a direction along and away from said path, including means to change the direction within a distance along said path less than the length of the cases to be unloaded, said container grippers engaging containers along first and second inclined path portions, both of which have a directional component in the direction of case movement and the first of which has a directional component toward said path and the second of which has a directional component away from said path, when the grippers are at a position beneath the level of the tops of containers and lifting the containers from the case as the grippers engaged with containers are moved along and away from said path; means to coordinate the speed of movement of the grippers and the case so the grippers move along and toward said path and along and away from said path with a speed component in the path direction equal to that of the case; said grippers being in a continuous column in mutual contact one with the next above each column of containers in the case as they move toward and away from said path.

22. A method of removing containers from a full depth case, i.e., a case with side and end walls that extend the full height of the containers, the steps comprising moving full depth cases of containers at random along a guiding path, moving a plurality of continuous columns of directly adjacent container grippers above and along said path and in a direction toward said path to a position where the grippers are in part below the walls of the case and then in a direction away from the path, engaging grippers with containers in the case so as to remove the containers from the case when the grippers are moved away from the path, and permitting any gripper to move upward relative to the adjacent grippers when it engages a wall of the case.

* * * * *